United States Patent
Tada et al.

(10) Patent No.: US 6,426,155 B1
(45) Date of Patent: Jul. 30, 2002

(54) MAGNETIC HARD DISC SUBSTRATE AND PROCESS FOR MANUFACTURING THE SAME

(75) Inventors: Kiyoshi Tada; Kenji Tomita; Kurata Awaya; Tomoya Utashiro, all of Oyama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/631,575

(22) Filed: Aug. 4, 2000

Related U.S. Application Data

(62) Division of application No. 09/094,915, filed on Jun. 12, 1998, now Pat. No. 6,123,603.

(30) Foreign Application Priority Data

| Jun. 17, 1997 | (JP) | 9-176563 |
|---|---|---|
| Dec. 3, 1997 | (JP) | 9-348537 |
| Dec. 3, 1997 | (JP) | 9-348538 |
| Dec. 3, 1997 | (JP) | 9-348539 |
| Dec. 3, 1997 | (JP) | 9-348540 |
| Dec. 3, 1997 | (JP) | 9-348541 |

(51) Int. Cl.$^7$ ................................. G11B 5/82
(52) U.S. Cl. ...................... 428/652; 428/141; 428/65.6; 428/694 SG
(58) Field of Search .......................... 428/141, 694 SG, 428/65.6, 652; 360/135

(56) References Cited

U.S. PATENT DOCUMENTS

| 4,839,005 A | * | 6/1989 | Katsumoto et al. ..... 204/129.46 |
| 4,842,917 A | * | 6/1989 | Ohno et al. .................. 428/141 |
| 6,149,696 A | * | 11/2000 | Jia ............................... 51/308 |
| 6,152,976 A | * | 11/2000 | Ishitobi et al. ................ 51/309 |

* cited by examiner

*Primary Examiner*—Stevan A. Resan
(74) *Attorney, Agent, or Firm*—Flynn, Thiel, Boutell & Tanis, P.C.

(57) ABSTRACT

A magnetic hard disc substrate made of an aluminum alloy for memory devices such as a computer must correspond to an improved structure in which the interval between a head and a medium is made narrower to attain high density recording. In order to prevent head crash, it is required that the magnetic hard disc substrate have a smooth surface and decreased defects. The present invention provides a process for manufacturing a magnetic hard disc substrate made of an aluminum alloy which satisfies the above requirements and also provides a disc substrate which has a surface roughness $Ra \leq 0.5$ nm and is free from abrasive flaws with a depth of 5 nm or more and from micro-waviness or provides a disc substrate which has a surface roughness $Ra \leq 5$ angstroms and a surface roughness $Rmax \leq 80$ angstroms and in which the number of scratches with a depth of 50 angstroms or more is 5 or less and the number of pits with a depth of 50 angstroms or less is 5 or less in the surface.

2 Claims, No Drawings

MAGNETIC HARD DISC SUBSTRATE AND PROCESS FOR MANUFACTURING THE SAME

This a division of Ser. No. 09/094,915, filed Jun. 12, 1998, now U.S. Pat. No. 6,123,603.

BACKGROUND OF THE INVENTION a) Field of the Invention

This invention relates to a Ni—P electroless-plated magnetic hard disc substrate made of an aluminum alloy which is a high capacity-type, such as those using a MR head or the like, and a process for manufacturing the magnetic disc.

b) Description of the Prior Art

A magnetic hard disc substrate can be generally obtained by punching a roll coil made of an aluminum alloy to prepare a blank, grinding the blank to remove flaws, waviness, and the like to obtain a substrate, then electroless plating the substrate with Ni—P, finish-polishing the plated substrate, then forming a magnetic film by magnetic sputtering, and coating the magnetic film with an overcoat to obtain a sputtering media. In order to allow the surface roughness and the flatness to fall in prescribed ranges respectively in these steps, the grinding of the magnetic hard disc substrate (blank) prior to the Ni—P electroless plating is performed by the following method: the substrate is put onto a polishing board to which a nonwoven fabric polishing cloth made of an organic polymer is applied and (a) the polishing operation is performed under a fixed pressure while supplying, to the polishing face, a polishing solution produced by dispersing metal oxide particles, such as alumina, titania, and zirconia with an average grain size of 0.3 to 5 $\mu$m, in an organic acid-type etchant wherein the polishing operation consists of a first stage polishing using abrasive grains of a larger size and successively second stage polishing using abrasive grains of a smaller size; or (b) the polishing operation is performed using a polishing solution produced by dispersing colloid particles of silica, zirconia, titania, or the like, with an average grain size of 0.01 to 0.3 $\mu$m, in an acid-type or alkali-type etchant.

In general, the magnetic hard disc substrate made of an aluminum alloy which is electroless plated with Ni—P and is used for a hard disc of memory devices such as a computer, is improving in recording density from year to year. There is a great demand for more improvement in the recording density. There is also a tendency to a higher density and larger capacity. It is therefore important to finish the magnetic hard disc substrate used in these fields so that the substrate has the prescribed surface roughness and flatness. Particularly, the realization of high density recording is due to a remarkable progress in low floatation technologies based on the improvement of the head, which requires the reduction of the interval between the head and the medium. With the reduction in the interval, the magnetic disc needs to have a smooth surface and mostly reduced surface defects. Specifically, the following polishing qualities are required: the surface roughness Ra<5 angstroms, the surface roughness Rmax$\leq$80 angstroms, and the surface is free from scratches with a depth of 50 angstroms or more and from pits with a depth of 50 angstroms or more. In the conventional method in which the polishing is performed using a polishing solution containing abrasive grains composed of a metal oxide such as alumina, titania, or zirconia, particles with a large grain size cannot be prevented from getting slightly mixed therein during a classification stage because these oxides are produced by grinding a massive raw material and classifying the ground material. The contaminant particles with a large grain size cause the production of scratches with a depth of 50 angstroms.

In the method (a) among the aforementioned conventional methods, though the waviness of the substrate decreases, the obtained value of Ra is about 10 angstroms and polishing flaws with a depth as long as 100 $\mu$m or more remains. In the method (b), in turn, the obtained value of Ra is about 3 angstroms and the polishing flaws decrease in depth to about 50 angstroms or less, but the waviness of the substrate remains. Also, the polishing speed is low, which requires a polishing time as long as about 5 minutes or more to attain the object Ra value. Magnetic hard disc substrates obtained after the polishing step in the conventional methods inevitably have the features that the surface roughness Ra is in a range from 7 to 15 angstroms, the surface roughness Rmax is in a range from 80 to 150 angstroms, and several scratches with a depth of 80 to 150 angstroms, some pits with a depth of 100 angstroms or less, and micro-waviness are produced. When using a suspension of known micro-sized and uniform silica particles to polish in order to avoid this situation, it takes a long time to polish because the particles are small. If erosive chemicals are added to accelerate the polishing, the silica will gel to-cause the silica particles to lose their uniformity. Thus a surface with the surface roughness Ra $\leq$5 angstroms and the surface roughness Rmax$\leq$80 angstroms cannot be achieved at present.

SUMMARY OF THE INVENTION

It is an object of the present invention to solve the above prior art problems and to provide a magnetic hard disc substrate with a smooth surface and decreased defects which makes it possible to achieve high density recording and also to provide a process for manufacturing the magnetic disc.

Another object of the present invention is to provide a magnetic hard disc substrate which has a surface roughness Ra$\leq$5 angstroms and is free from scratches (grinding flaws) with a depth of 50 angstroms or more and from micro-waviness.

A further object of the present invention to provide a magnetic disc which has a surface roughness Ra$\leq$5 angstroms and a surface roughness Rmax$\leq$80 angstroms and is free from scratches with a depth of 50 angstroms or more and from pits with a depth of 50 angstroms or more.

A still further object of the present invention is to provide a process for manufacturing the magnetic hard disc substrate in a short time and in a simple manner.

A still further object of the present invention relates to the above process using silica abrasive grains and is to provide a process for manufacturing the magnetic hard disc substrate having excellent surface properties in an efficient manner by adding, to the polishing agent, additives for avoiding gelation and for improving the rate of polishing.

Still further objects will be clear from the descriptions herein below.

The present invention resides to a polishing process in succession to a Ni—P electroless plating process in a process for manufacturing an aluminum alloy magnetic hard disc substrate and comprises: dividing the polishing process into plural polishing stages, polishing a subject material using a polishing solution containing metal oxide abrasive grains with an average grain size of 0.3 to 5 $\mu$m in a polishing stage preceding a final polishing stage, and polishing the treated subject material using a polishing solution containing colloid particles with a grain size of 0.01 $\mu$m to 0.3 $\mu$m in the final polishing stage. It is noted that the polishing process using a metal oxide abrasive grains, which is followed by the final polishing process, may be divided into a plurality of polishing steps using particles with different grain sizes respectively.

According to a further aspect of the present invention, there is provided a process for manufacturing a magnetic hard disc substrate comprises: processing a subject material until the surface roughness Ra is 15 angstroms or less and the surface roughness Rmax is 200 angstroms or less and then polishing the treated subject material using a colloidal abrasive agent containing silica particles with a grain size of 0.5 μm or less, to which are added additives for preventing gelation and accelerating the rate of polishing.

Preferably the above additive contains 0.01 mol/l of a trivalent iron ion as an inorganic acid salt or organic acid salt in the present invention.

Other examples of the additive include 0.1 to 2.0 mol/l of hydroxyacetic acid, 0.1 to 2.0 mol/l of molybdenum oxide (hexavalent), 0.01% or more of hydrogen peroxide, 0.03 to 4.0 mol/l of aluminum nitrate, 0.03 to 2.0 mol/l of nitric acid, or a mixture thereof.

In the present invention having the above structure, a disc substrate which has a surface roughness Ra≦5 angstroms and is almost free from abrasive flaws with a depth of 50 angstroms or more and micro-waviness can be obtained.

In addition, a disc substrate having the polished qualities, in which the surface roughness Ra is 5 angstroms or less and the surface roughness Rmax is 80 angstroms or less and the number of scratches with a depth 50 angstroms or more and pits with a depth of 50 angstroms or less are both reduced to 5 or less, can be obtained.

DESCRIPTION OF THE PREFERRED EMBODIMENTS

The present invention will be explained in detail.

A first process of the present invention comprises a polishing process using abrasive grains composed of a metal oxide, the polishing process being carried out prior to the final polishing process. In the polishing process prior to the final polishing process, a subject substrate is polished using a polishing solution containing abrasive grains of a metal oxide such as alumina, titania, zirconia, or the like, the abrasive grains having a grain size of 0.3 to 5 μm. When the average grain size of the metal oxide abrasive grains is less than 0.3 μm, the polishing rate is low and hence it takes a long polishing time to reach the intended polished finish, though the surface roughness of the subject substrate is improved. On the other hand, when the average grain size exceeds 5 μm, the polishing rate is high but the surface is more roughened and abrasive flaws increases. Incidentally, this polishing process may be carried out in a plurality of polishing stages. Illustrating, for example, a case of 2 stages, the process includes a first stage of polishing using metal oxide abrasive grains with an average grain size of 0.5 to 5 μm and a second stage of polishing using metal oxide abrasive grains with an average grain size of 0.3 to 1.5 μm. In this case, the second polishing stage is for a treating process preceding the final polishing process.

The substrate which has been roughly finished to the given precision and treated so as to be free from waviness and plating flaws is then subjected to the final polishing process. This final polishing process is performed using, as the polishing material, a polishing solution containing colloid particles of silica, titania, zirconia, or the like with an average grain size of 0.01 to 0.3 μm to restrain the production of abrasive flaws to the extreme. If the average grain size of the colloid particles of silica, titania, zirconia, or the like is smaller than 0.01 μm, the polishing process requires a long polishing time so that it is unpractical. On the other hand, if the average grain size of the colloid particles exceeds 0.3 μm, the surface roughness Ra of the magnetic hard disc substrate is more than 50 angstroms.

The metal oxide abrasive grains used in the polishing process preceding the final polishing process is dispersed in an aqueous solution in a proportion of 1 to 40%. The aqueous solution is preferably adjusted to an acidic range of a pH of 2 to 6 using nitric acid, phosphoric acid, sulfamic acid, or the like. The colloid particles used in the final polishing process is dispersed in an aqueous solution in a proportion of 1 to 40% similarly. The aqueous solution is preferably adjusted to an acidic range of a pH of 2 to 6 using nitric acid, phosphoric acid, sulfamic acid, or the like or to an alkaline range using sodium hydroxide.

The abrasive grains used for the polishing in each stage gradually decrease in size with an increase in the number of stages. The polishing in each stage may be continuously performed using the same polishing machine and abrasive grains with different sizes. It is however desirable that each different polishing machine be used every polishing stage and the substrate be washed every time when the polishing in each stage is completed to prevent the contamination of the abrasive grains used in the antecedent stage. These devised measures make it possible to prepare a magnetic hard disc substrate which has a surface roughness Ra≦5 angstroms and is free from abrasive flaws with a depth of 50 angstroms or more and from micro-waviness.

Another embodiment of the method of the present invention comprises a step of processing the substrate using an abrasive agent of alumina, for example, with an average grain size of 0.3 to 2.0 μm according to a known method until the surface roughnesses Ra and Rmax become 15 angstroms or less and 200 angstroms or less and, preferably 10 angstroms or less and 100 angstroms or less, respectively, and a step of polishing using a colloidal abrasive agent containing an additive possessing gelation preventive and polishing promoting activities and silica particles with a grain size of 0.5 μm or less. Specifically, because it takes a long polishing time to obtain a substrate with the prescribed roughness only by using a colloidal abrasive agent containing silica particles, first the substrate is processed using an abrasive agent of alumina or the like, for example, with a grain size of 0.3 to 2.0 μm, until the surface roughnesses Ra and Rmax become 15 angstroms or less and 200 angstroms or less and, preferably 10 angstroms or less and 100 angstroms or less respectively. After that, the substrate is polished using a colloidal abrasive agent containing silica particles. The silica particles used in the present invention are preferably a silica sol prepared by a known preparative method in which the silica sol is produced from an aqueous silicic acid solution. Specifically, the final polishing process is performed using spherical or spheroidal silica abrasive grains with a uniform grain size of 0.5 μm or less and, preferably, 0.05 to 0.3 μm, which cannot be attained by pulverization or classification. A prescribed amount of additives is added to the abrasive agent used in the polishing process using silica for the purpose of preventing gelation and outstandingly improving the polishing rate, which is a significant feature of the present invention.

The aforementioned additive used in the present invention is any one of the following materials:

(a) 0.01 mol/l or more and preferably 0.01 to 3 mol/l of a salt of a trivalent iron and an inorganic acid or organic acid; wherein examples of an inorganic acid include hydrochloric acid, sulfuric acid, nitric acid, and phosphoric acid; examples of the organic acid include citric acid, acetic acid, and oxalic acid; the amount of each of these inorganic acids or organic acids is controlled in such a manner that it is sufficient to form a salt but not excessive to avoid the existence of free ions of the acid. If a salt containing less than 0.01 mol/l of trivalent iron ions is added, the effect of iron ions is insufficient, whereas if the amount of trivalent ions exceeds 3 mol/l, the addition of the iron ions rather imparts an adverse effect.

(b) 0.1 to 2.0 mol/l of hydroxyacetic acid; if the amount of hydroxyacetic acid is less than 0.1 mol/l, no effect of the addition can be produced whereas an amount exceeding 2.0 mol/l rather imparts an adverse effect.

(c) 0.1 to 2.0 mol/l of molybdenum oxide (hexavalent); preferably 0.1 to 1 mol/l of molybdenum oxide (hexavalent) is added; and if the amount of molybdenum oxide is less than 0.1 mol/l, only an insufficient effect of the addition can be produced whereas an amount exceeding 2.0 mol/l rather imparts an adverse effect.

(d) 0.01% or more of hydrogen peroxide, preferably 0.01 to 40%, and more preferably, 0.01 to 30% of hydrogen peroxide, is added; and if the amount of hydrogen peroxide is less than 0.01%, only an insufficient effect of the addition can be produced whereas an amount exceeding 40% rather imparts an adverse effect.

(e) 0.03 to 4.0 mol/l of aluminum nitrate, preferably 0.1 to 2.0 mol/l of aluminum nitrate is added; and if the amount of aluminum nitrate is less than 0.03 mol/l, only an insufficient effect of the addition can be produced whereas an amount exceeding 4.0 mol/l rather imparts an adverse effect.

(f) 0.03 to 2.0 mol/l of nitric acid, preferably 0.1 to 1.0 mol/l of nitric acid is added; and if the amount of nitric acid is less than 0.03 mol/l, only an insufficient effect of the addition can be produced whereas an amount exceeding 2.0 mol/l rather imparts an adverse effect.

In this manner, according to the present invention, a disc substrate having the polished qualities in which the surface roughness Ra is 5 angstroms or less and the surface roughness Rmax is 80 angstroms or less and the numbers of scratches with a depth 50 angstroms and pits with a depth of 50 angstroms are both reduced to 5 or less can be obtained.

Also, according to the present invention, a disc substrate having the above polished qualities can be produced in a short time in a simple manner. Thus, a magnetic hard disc substrate can be obtained which can correspond to a reduced interval between a head and a medium, the reduction of the interval resulting from the low floatation of the head with an improvement in high density recording.

EXAMPLE

The present invention will be explained in more detail by way of examples, which are not intended to be limiting of the present invention.

Example 1

A donut-shaped blank (a product equivalent to 5086) made of an aluminum alloy with an outside diameter of 3.5 inches and a thickness of about 20 $\mu$m was processed by lathe turning and subjected to Ni—P electroless plating to form a plating coating with a thickness of about 20 $\mu$m, thereby preparing a sample. The sample was subjected to a polishing process according to the present invention. In Example 1, the sample was polished for 3 minutes using a polishing solution produced by dispersing 10 wt % of alumina with a maximum grain size of 1 $\mu$m and an average grain size of 0.8 $\mu$m in an aqueous solution adjusted to acidic range of pH 4 using sulfamic acid. Next, the sample was polished for 1 minute using a polishing solution produced by dispersing 10 wt % of alumina with a maximum grain size of 0.5 $\mu$m and an average grain size of 0.4 $\mu$m in an aqueous solution adjusted to an acidic range of pH 4 using the same sulfamic acid as above. Then the sample was finally polished for 3 minutes using a polishing solution produced by dispersing 10 wt % of silica with a maximum grain size of 0.1 $\mu$m and an average grain size of 0.05 $\mu$m in an aqueous 2% sodium hydroxide solution. In this polishing, 25 substrates per one time were set in a polishing machine to carry out the polishing and 5 samples among these 25 samples optionally selected and were designated as test samples.

Example 2

The same Ni—P electroless plated blank made of an aluminum alloy as in Example 1 was polished for 3 minutes using a polishing solution produced by dispersing 10 wt % of alumina with a maximum grain size of 1 $\mu$m and an average grain size of 0.8 $\mu$m in an aqueous solution adjusted to acidic range of pH 4 using sulfamic acid. Then, the sample was finally polished for 6 minutes using a polishing solution produced by dispersing 10 wt % of silica with a maximum grain size of 0.1 $\mu$m and an average grain size of 0.05 $\mu$m in an aqueous 2% sodium hydroxide solution. In this polishing, 5 samples were optionally selected and designated as test samples in the same manner as in Example 1.

Comparative Examples 1 to 3

For comparison, the same Ni—P plated blanks made of an aluminum alloy as in Example 1 were polished in the following different conditions; for 3 minutes using a polishing solution produced by dispersing 10 wt % of alumina with a maximum grain size of 1 $\mu$m and an average grain size of 0.8 $\mu$m in an aqueous solution adjusted to an acidic range of pH 4 using sulfamic acid (Comparative Example 1); for 6 minutes using a polishing solution produced by dispersing 10 wt % of alumina with a maximum grain size of 0.5 $\mu$m and an average grain size of 0.4 $\mu$m in the same aqueous solution as above (Comparative Example 2); and for 2 minutes using a polishing solution produced by dispersing 10 wt % of silica with a maximum grain size of 0.1 $\mu$m and an average grain size of 0.05 $\mu$m in an aqueous 2% sodium hydroxide solution (Comparative Example 3). In this polishing, 5 samples were optionally selected and were designated as test samples in the same manner as in Example 1.

Measurements were made to determine the surface roughness (Ra), waviness (Wca), and abrasive flaws of the magnetic hard disc substrates obtained in Examples 1 and 2 and Comparative Examples 1 to 3. Test conditions of these measurements are shown in the following. Each test was made for 5 test samples of each example and an average of the measured results of these 5 test samples represents the result of each example.

Surface Roughness

Test machine: Tencor P12 manufactured by Tencor Co., Ltd.

Tracer diameter: 0.2 $\mu$m

Scan Length: 250 $\mu$m

Scan Speed: 5 $\mu$m/s Cut off: 25 $\mu$m

Waviness: determined according to a standard based on waviness (Wca) of the center line of a filtered wave.

Test machine: Tencor P12 manufactured by Tencor
Tracer diameter: 0.2 μm
Scan Length: 5 mm
Scan Speed: 400μm/s
Cut off: 800 μm
"◉", "○", "Δ", and "×" in Table 1 indicate that Wca as a standard is less than 2 nm, from 2 to 5 nm, 5 to 10 nm, and more than 10 nm, respectively, wherein representations including and above "○" show "pass".

Depth of Abrasive Flaws
Test machine: MHT-3 System manufactured by WYKO
Measurement magnification: ×400
PSI mode (Microregion measuring mode) "◉", "○", "Δ", and "×" in Table 1 indicate that the depth is less than 3 nm, from 3 to 5 nm, 5 to 10 nm, and more than 10 nm, respectively, wherein representations including and above "○" show "pass".

TABLE 1

|  | Polished amount (μm) | Surface roughness (Ra) (nm) | Waviness (Wcs) | Abrasive flaw |
|---|---|---|---|---|
| Ex. 1 | 1.2 | 0.3 | ◉ | ◉ |
| Ex. 2 | 1.2 | 0.4 | ○ | ○ |
| Comp. Ex. 1 | 1.0 | 1.3 | ○ | × |
| Comp. Ex. 2 | 0.5 | 0.8 | Δ | × |
| Comp. Ex. 3 | 0.4 | 0.4 | × | × |

Example 3

A donut-shaped blank (a product equivalent to 5086) made of an aluminum alloy with an outside diameter of 3.5 inches and a thickness of about 20 μm was processed by lathe turning and subjected to Ni—P electroless plating to form a plating coating with a thickness of about 20 μm, thereby preparing a sample. The sample was polished according to the present invention. The surface roughness Ra of the Ni—P electroless plated substrate was 80 angstroms. The substrate was polished using an alumina abrasive agent with a grain size of 1.3 μm until the surface roughnesses Ra and Rmax became 22 angstroms and 170 angstroms respectively. Then, using another machine, the substrate was polished by an alumina abrasive agent with a grain size of 0.5 μm until the surface roughnesses Ra and Rmax became 10 angstroms and 100 angstroms respectively. The resulting processed material was used as a test material which was then subjected to final polishing. Abrasive grains used in the final polishing included silica abrasive grains with grain sizes of 0.1 μm, 0.05 μm, and 0.6 μm and, for comparison, an alumina abrasive agent with a size of 0.5 μm. In the tests, the abrasive grains used in the Examples contained iron chloride (trivalent) iron oxalate (trivalent), and iron citrate (trivalent) in varied amounts, as shown in Table 1, for the purposes of preventing gelation and improving the polishing rate. Each measured Ra, Rmax, scratches, pits, and presence of projections of the substrate surface and polishing rate were compared. The integrated evaluation of these comparisons are shown in Table 2.

In Table 2, in the evaluation of scratches, "×" indicates that the number of scratches is more than 5 per face and the depth is more than 8 nm, "○" indicates that the number of scratches is from 2 to 5 per face and the depth is from 4 to 8 nm, and "◉" indicates that the number of scratches is less than 2 per face and the depth is less than 4 nm. In the evaluation of pits, "×" indicates that the number of pits is more than 5 per face and the depth is more than 10 nm, "○" indicates that the number of pits is from 1 to 5 per face and the depth is from 2 to 10 nm, and "◉" indicates that no pit was observed. The projection means a convex portion (on the surface) with 100 angstroms or more in height determined from an average line of the roughness curve in AFM and with 30 μm or less in length in a sectional direction, the convex portion consisting of foreign materials adhering to the surface and having a strength sufficient to destroy the head when it collapses with the head. In the evaluation of the projection, "◉" indicates that the number of projections is less than one for the surfaces and back faces of 10 substrates, "○" indicates that the number of projections is less than one for the surfaces and back faces of 2 to 9 substrates, and "×" indicates the number of projections is more than one for the surface and back face of one substrate. For the evaluation of polishing rate, "×", "○", and "◉" in Table 1 indicate that the rate is less than 0.01 μm/min, from 0.01 to 0.05 μm/min, and more than 0.05 μm/min, respectively.

Example 4

The same procedures and evaluations as in Example 3 were performed except that the additive was replaced with hydroxyacetic acid. In this example, the amount and the grain size of hydroxyacetic acid as the additive were varied. These results are shown in Table 2.

Example 5

The same procedures and evaluations as in Example 3 were performed except that the additive was replaced with molybdenum oxide. In this example, the amount and the grain size of molybdenum oxide as the additive were varied. These results are shown in Table 2.

Example 6

The same procedures and evaluations as in Example 3 were performed except that the additive was replaced with 10% or 30% hydrogen peroxide. These results are shown in Table 2.

Example 7

The same procedures and evaluations as in Example 3 were performed except that the additive was replaced with aluminum nitrate. In this example, the amount of aluminum nitrate as the additive was varied. These results are shown in Table 2.

Example 8

The same procedures and evaluations as in Example 3 were performed except that the additive was replaced with nitric acid. In this example, the amount and the grain size of nitric acid as the additive were varied. These results are shown in Table 2.

TABLE 2

| * | | Additive | Ra(nm) | Rmax (nm) | Scratch | Pit | Projection | Polishing rate | Integrated evaluation |
|---|---|---|---|---|---|---|---|---|---|
| Ex. 3 | In | 0.5 mol/l iron chloride grain size: 0.1 μm | ○(0.4) | ○(4.0) | ⊚ | ⊚ | ⊚ | ○ | ⊚ |
| | In | 0.5 mol/l iron chloride grain size: 0.05 μm | ⊚(0.3) | ⊚(3.4) | ⊚ | ⊚ | ⊚ | ○ | ⊚ |
| | In | 2.5 mol/l iron chloride grain size: 0.1 μm | ○(0.4) | ○(4.1) | ⊚ | ⊚ | ⊚ | ⊚ | ⊚ |
| | In | 0.5 mol/l iron oxalate grain size: 0.1 μm | ○(0.4) | ○(4.2) | ⊚ | ⊚ | ○ | ○ | ○ |
| | In | 0.5 mol/l iron citrate grain size: 0.1 μm | ○(0.4) | ○(4.1) | ⊚ | ⊚ | ⊚ | ○ | ⊚ |
| | Out | 0.5 mol/l iron chloride grain size: 0.6 μm | X(1.2) | X(13.3) | ○ | ○ | ○ | ⊚ | X |
| Ex. 4 | In | 0.1 mol/l hydroxyacetic acid grain size: 0.1 μm | ○(0.4) | ○(4.1) | ⊚ | ⊚ | ⊚ | ○ | ○ |
| | In | 1.0 mol/l hydroxyacetic acid grain size: 0.1 μm | ⊚(0.4) | ⊚(3.4) | ⊚ | ⊚ | ⊚ | ⊚ | ⊚ |
| | out | 3.0 mol/l hydroxyacetic acid grain size: 0.1 μm | ○(0.5) | ○(4.8) | ○ | X | ○ | ⊚ | X |
| | out | 1.0 mol/l hydroxyacetic acid grain size: 0.6 μm | X(0.9) | X(10.1) | X | ○ | ○ | ⊚ | X |
| Ex. 5 | In | 0.1 mol/l molybdenum oxide grain size: 0.1 μm | ○(0.5) | ○(4.4) | ⊚ | ⊚ | ⊚ | ○ | ⊚ |
| | In | 1.0 mol/l molybdenum oxide grain size: 0.1 μm | ⊚(0.4) | ⊚(3.4) | ⊚ | ⊚ | ⊚ | ⊚ | ⊚ |
| | out | 3.0 mol/l molybdemum oxide grain size: 0.1 μm | ○(0.6) | ○(5.8) | X | X | ○ | ⊚ | X |
| | out | 1.0 mol/l molybdenum oxide grain size: 0.6 μm | X(1.2) | X(15.7) | ○ | ○ | ○ | ⊚ | X |
| Ex. 6 | In | 30% hydrogen peroxide, grain size: 0.1 μm | ○(0.4) | ○(4.0) | ⊚ | ⊚ | ⊚ | ○ | ⊚ |
| | In | 30% hydrogen peroxide, grain size: 0.05 μm | ⊚(0.3) | ⊚(3.4) | ⊚ | ⊚ | ⊚ | ○ | ⊚ |
| | In | 10% hydrogen peroxide, grain size: 0.1 μm | ○(0.4) | ○(4.1) | ⊚ | ⊚ | ⊚ | ○ | ○ |
| | Out | 30% hydrogen peroxide, alumina abrasive grain size: 0.5 μm | X(1.0) | X(10.3) | X | X | X | ○ | X |
| | Out | 30% hydrogen peroxide, grain size: 0.6 μm | X(1.2) | X(13.3) | ○ | ○ | ○ | ⊚ | X |
| Ex. 7 | In | 0.1 mol/l aluminum nitrate grain size: 0.1 μm | ○(0.4) | ○(3.9) | ⊚ | ⊚ | ⊚ | ○ | ○ |
| | In | 1.5 mol/l aluminum nitrate grain size: 0.1 μm | ⊚(0.4) | ⊚(3.5) | ⊚ | ⊚ | ⊚ | ○ | ⊚ |
| | Out | 5.0 mol/l aluminum nitrate graim size: 0.1 μm | ○(0.5) | ○(5.4) | X | X | X | ⊚ | X |
| | Out | 1.5 mol/l aluminum nitrate grain size: 0.6 μm | X(1.0) | X(12.9) | ○ | ○ | ○ | ⊚ | X |
| Ex. 8 | In | 0.03 mol/l nitric acid grain size: 0.1 μm | ○(0.4) | ○(4.0) | ⊚ | ⊚ | ⊚ | ○ | ○ |
| | In | 0.5 moL/l nitric acid grain size: 0.1 μm | ⊚(0.3) | ⊚(3.4) | ⊚ | ⊚ | ⊚ | ○ | ⊚ |
| | Out | 2.5 mol/l nitric acid graim size: 0.1 μm | ○(0.5) | ○(5.7) | ⊚ | ⊚ | X | ⊚ | X |
| | Out | 0.5 mol/l nitric acid grain size: 0.6 μm | X(1.1) | X(12.4) | ○ | ○ | ○ | ⊚ | X |
| | Out | 0.5 mol/l hydrochloric acid grain size: 0.1 μm | ○(0.4) | ○(4.2) | ⊚ | X | X | ○ | X |
| Comp. Ex. (Alumina, 0.5 μm) | | | X(1.0) | X(10.3) | X | X | X | ○ | X |
| Non additive, grain size: 0.1 μm | | | ○(0.5) | ○(4.7) | ○ | ○ | ○ | X | X |

Integrated evaluation (⊚: Excellent, ○: Practical, X: Unpractical)
*: In: described in examples, Out: not described in examples

What is claimed is:

1. A Ni—P electroless plated aluminum alloy magnetic hard disc substrate which has a surface roughness Ra of 0.5 angstroms or less and a surface roughness Rmax of 80 angstroms or less and in which the number of scratches with a depth of 50 angstroms or more is 5 or less and the number of pits with a depth of 50 angstroms or less is 5 or less in the surface.

2. A Ni—P electroless plated aluminum alloy magnetic hard disc substrate which has a surface roughness Ra≦0.5 nm and is free from abrasive flaws with a depth of 5 nm or more and has a microwaviness Wca of less than 2 nm.

* * * * *